United States Patent [19]
Shapcott

[11] Patent Number: 5,370,519
[45] Date of Patent: Dec. 6, 1994

[54] APPARATUS FOR CUTTING AND DISPENSING CAP LINING MATERIAL

[75] Inventor: Michael Shapcott, Hometown, Pa.

[73] Assignee: Zapata Technologies, Inc., Hazleton, Pa.

[21] Appl. No.: 8,986

[22] Filed: Jan. 26, 1993

[51] Int. Cl.⁵ .............................................. B26D 5/22
[52] U.S. Cl. ........................... 425/310; 74/436; 74/820; 264/142; 425/311; 425/313; 425/809
[58] Field of Search ............... 74/436, 820; 425/809, 425/310, 295, 296, 308, 311, 313, 314; 264/141, 142, 148; 118/215

[56] References Cited

U.S. PATENT DOCUMENTS

| | | | |
|---|---|---|---|
| 2,178,431 | 10/1939 | Orr | 425/313 |
| 2,540,224 | 2/1951 | Vasselli | 74/436 |
| 3,135,019 | 6/1964 | Aichele | 423/126.1 |
| 3,212,131 | 10/1965 | Aichele | 425/809 |
| 3,360,827 | 1/1968 | Aichele | 425/128 |
| 3,414,938 | 12/1968 | Caviglia | 425/809 |
| 3,782,329 | 1/1974 | Everett | 118/218 |
| 3,827,843 | 8/1974 | Blouch | 425/809 |
| 3,867,081 | 2/1975 | Everett | 425/809 |
| 3,955,605 | 5/1976 | Zupan | 141/1 R |
| 4,037,493 | 7/1977 | Freer | 74/820 |
| 4,060,053 | 11/1977 | Ohmi | 118/215 |
| 4,287,847 | 9/1981 | Ohmi | 118/215 |
| 4,302,870 | 12/1981 | Schalles et al. | 74/820 |
| 4,317,385 | 3/1982 | Harvey et al. | 74/820 |

Primary Examiner—Jay H. Woo
Assistant Examiner—Duane S. Smith
Attorney, Agent, or Firm—Pennie & Edmonds

[57] ABSTRACT

An apparatus for cutting and dispensing segments of thermoplastic material into receptacles such as crowns, particularly into those having relatively high sidewalls, includes a conveyor for conveying the crowns through a passageway at predetermined speeds, an extruder for extruding thermoplastic material through a discharge opening, a rotary knife having blades for cutting the extruded material into segments and depositing the segments into the receptacles as they are conveyed through the passage, and a drive system for rotating the blade in response to the conveying of the receptacles. The output or driven shaft of the drive system is coupled to the rotary knife and intermittently rotates 180 degrees at a time at a speed which is twice that of the input or drive shaft, thereby avoiding contact of the knife blades with the receptacle sidewalls and ensuring clean cutting of the thermoplastic material even at low speeds of closure conveyance.

27 Claims, 5 Drawing Sheets

APPARATUS FOR CUTTING AND DISPENSING CAP LINING MATERIAL

BACKGROUND OF THE INVENTION

This invention relates generally to an improved processing system in which a measured amount of extrudate is severed by a rotating cutting means and deposited in a receptacle traveling on a conveyor, and more particularly, to an apparatus for accurately depositing predetermined quantities of molten polymer extrudate into deeply recessed receptacles (such as caps and crowns which have relatively high sidewalls) to form a lining therein.

Heretofore, extrudate material has been deposited in each crown shell by controlling the rate of extrusion of the extrudate material and then directing this material through one or more rotating cutting blades timed to the feed rate of the crowns past the depositing station. In conventional high speed crown making systems, the speed of the conveyor, the feed rate of the extrudate material, and the angular velocity of the cutting blades are all proportional at any given rate of production. Therefore, for any rate of production, the feed rate of the crowns must be compatible with the cutting rate of the blades, and these in turn must be compatible with the minimum cooling rate of the formed liner.

An illustrative prior art apparatus for forming liners in crowns is described in U.S. Pat. No. 3,360,827 to Aichele, wherein a rotatably mounted blade is rotated in synchronism with the movement of a conveyor. The cutting blade is rotated at a uniform speed that is directly proportional to the speed of shell conveyance. During each rotation of the knife, a segment or pellet of extruded thermoplastic polymer is severed, and the radial tip of a blade enters and exits the recess of a shell as it is conveyed, thereby depositing the polymer pellet centrally therein. A subsequent operation forms the pellet into a desired liner shape.

Although the high feed rate apparatus disclosed in this patent operates satisfactorily for providing thermoplastic material in bottle caps or crowns of the usual shallow type (crown heights of approximately 0.23 inch to approximately 0.267 inch), it is not suitable for the lining of deeply recessed caps such as the twist off type, which have crown heights of approximately 0.6 inch to approximately 0.869 inch. The reason conventional systems such as that described above can not process deeply recessed caps at high feed rates is that the radial tip of the cutting blade can not enter and exit the receptacle recess quickly enough to avoid contact with the receptacle sidewall.

One solution to this problem is disclosed in U.S. Pat. No. 3,782,329 to Everett. The Everett device provides a cam and follower arrangement to elevate the blade during its rotation, thus preventing interference with the cap sidewalls before and after depositing the lining material. The Everett arrangement, however, is subject to rapid wear of its moving parts, is difficult to adapt to high feed rate operation, and is not suitable for commercial mass production. Further, it can not be easily retrofitted into existing crown processing devices.

Another prior art approach to dispensing liner material into deeply recessed receptacles is described in U.S. Pat. No. 4,060,953 to Ohmi. Ohmi discloses that the speed of blade rotation can be varied in a predetermined manner so as to prevent the tip of the cutting blade from contacting the cap shell sidewall. In the Ohmi apparatus, the blade is rotated at a non-uniform speed, in response to the speed of conveyance of the cap shells, such that the speed of the blade gradually decreases as the exterior end of the blade approaches the shell conveying passage and such that the speed of the blade gradually increases as the exterior blade end moves away from the shell conveying passage. The variation in cutting blade rotational speed is achieved by the use of a gear drive system that comprises non-circular gears (e.g., elliptical gears). A disadvantage of the Ohmi system, however, is that for every crown shell design, the user must select, either by trial and error or by a complicated mathematical derivation, a set of non-circular gears which will provide the necessary clearances from the crown shell sidewalls.

A further disadvantage of known high feed rate crown processing devices is that they are not easily adapted for use in cutting and dispensing recently developed thermoplastic polymer extrudates. The newer compounds have longer molding times and therefore require slower feed rates. Hence, in order to utilize them in a conventional high feed rate crown processing system, the conveying speed and the angular velocity of the blade synchronized therewith must be reduced. At lower feed rates, however, the metered quantities of extrudate material are frequently not centered on the crown after being severed by the cutting blade. That the metered quantities of extrudate material are centered on the crowns at high production rates but are not centered at low production rates indicates that the extrudate material absorbs the shock of the cutting blade and elongates rather than being sheared at the proportionally reduced cutting velocity. Further, because transfer of the cut segment from the knife blade onto the receptacle base depends upon adhesion of the segment to the base, decreases in blade speed interfere with efficient transfer by significantly reducing the force with which the segment is deposited within the base.

Seeking to address this failing in the prior art, U.S. Pat. No. 3,955,605 to Zupan discloses a high feed rate crown processing machine which is also capable of accurately severing and depositing extrudate materials at substantially reduced feed rates. The Zupan system includes a variable speed conveyor and a pair of counter rotating cutting blades. The conveyor and cutting blades are driven at speeds independent of each other, and the blades are intermittent in operation so that the blades can be rotated at a sufficient velocity to sever the extrudate without regard to the feed rate. A disadvantage of the Zupan system is that it relies solely on gravity for placement of the severed segment into the crown. Additionally, severed segments tend to adhere to one of the blades. Accordingly, the Zupan system is not suitable for higher production rates, such as above 2000 crowns per minute, which are typically achieved by modern crown processing machines.

SUMMARY OF THE INVENTION

It is therefore an object of this invention to provide an improved apparatus which can form and centrally deposit individual segments of polymer extrudate material accurately and at high speeds into receptacles such as crown shells, even into deeply recessed receptacles.

It is a further object of this invention to provide a processing system which can utilize polymer extrudate materials of widely varying molding rates and which can be operated at both high and low feed rates without suffering any loss of accuracy in depositing severed extrudate material.

It is yet another object of this invention to provide a cutting blade which can compensate for thermoplastic buildup on the blade or other alignment inaccuracies so that precise cutting of the thermoplastic material is obtained.

It is still another object of the present invention to provide a knife timing mechanism which can be readily retrofitted onto an existing extrudate material processing apparatus.

In general, these and other objects are achieved by an apparatus which includes conveying means that define a passage for conveying receptacles having high sidewalls, means for extruding extrudate material through a discharge opening into the passage, a knife positioned adjacent the discharge opening for cutting the extrudate material into segments, and means for intermittently rotating the knife so that it does not contact the sidewalls of the receptacles as they pass by.

The knife rotating means includes an input shaft, means for substantially uniformly rotating the input shaft at a uniform angular velocity, an output shaft coupled to the knife for intermittent rotation therewith, and transmission means interconnecting the input and output shafts for converting the substantially uniform rotation of the input shaft into intermittent rotation of the output shaft.

The conveying means preferably comprises a rotating turret for conveying the receptacles at a speed proportional to the uniform angular velocity. Preferably, the knife is coupled to the output shaft by a pivot pin, and is biased by a spring about an axis defined by the pivot pin.

The transmission means includes first gear means that comprise a plurality of projecting members and means for mounting the projecting members relative to the input shaft. The mounting means defines an axis of rotation coaxial with the input shaft and preferably comprises a first member coupled to the drive shaft wherein the projecting members extend from a plane transverse to the axis of rotation. The mounting means further comprises a second member coaxially aligned with the first member, and the said first and second members are interconnected by the projecting members.

Preferably, the projecting members are rollers, with each of said rollers being adapted to rotate about an axis parallel to the axis of rotation. The first gear means further comprises means for intermittently preventing rotation of the output shaft. The preventing means comprises a cam member coupled to said first member for rotation therewith. The peripheral surface of the cam member defines a pair of arcuate lobes.

The transmission means further comprises second gear means including an intermediate shaft defining a second axis of rotation and a plate member defining a plurality of slots dimensioned and arranged for engagement with the projecting members. The plate member is secured to the intermediate shaft for rotation therewith in response to engagement with said projecting members.

Preferably the plate member defines four slots, adjacent slots being angularly spaced 90° from each other, wherein engagement by one of said projecting members with one of the slots converts a 180° rotation of the input shaft into 90° rotation of the plate member. A peripheral surface of the plate member also defines four arcuately recessed surfaces which are adapted to engage the lobes of the cam member. The lobes are arranged for movement relative to the projecting members such that the plate member is prevented from rotating unless a projecting member is in a slot.

Yet another embodiment of the invention relates to a method for dispensing segments of extrudate material into receptacles having relatively deep sidewalls. The receptacles are conveyed past an extrudate forming station at a predetermined velocity. The extrudate is cut as it is formed by rotating a knife at a velocity which is greater than the predetermined velocity of the receptacles. Thus, extrudates are cut and deposited in the receptacles by the knife as the receptacles pass thereby. The knife extends into the receptacles when it is rotating, but remains at rest in a position outside of the receptacles thereafter to allow the receptacles to pass thereby while avoiding contacting the sidewalls of the receptacles.

This method also includes the steps of preventing the knife from any movement when at rest to prevent "floating". Preferably, the knife is rotated at a velocity which is about twice that of the receptacles. Moreover, the rotation of the knife is coordinated with the velocity of movement of the receptacles so that the knife rotates into each receptacle regardless of the predetermined velocity of the receptacles.

BRIEF DESCRIPTION OF THE DRAWINGS

The apparatus of this invention is described below with reference to preferred embodiments shown in the accompanying drawings in which.

DETAILED DESCRIPTION OF THE INVENTION

Figure 1:
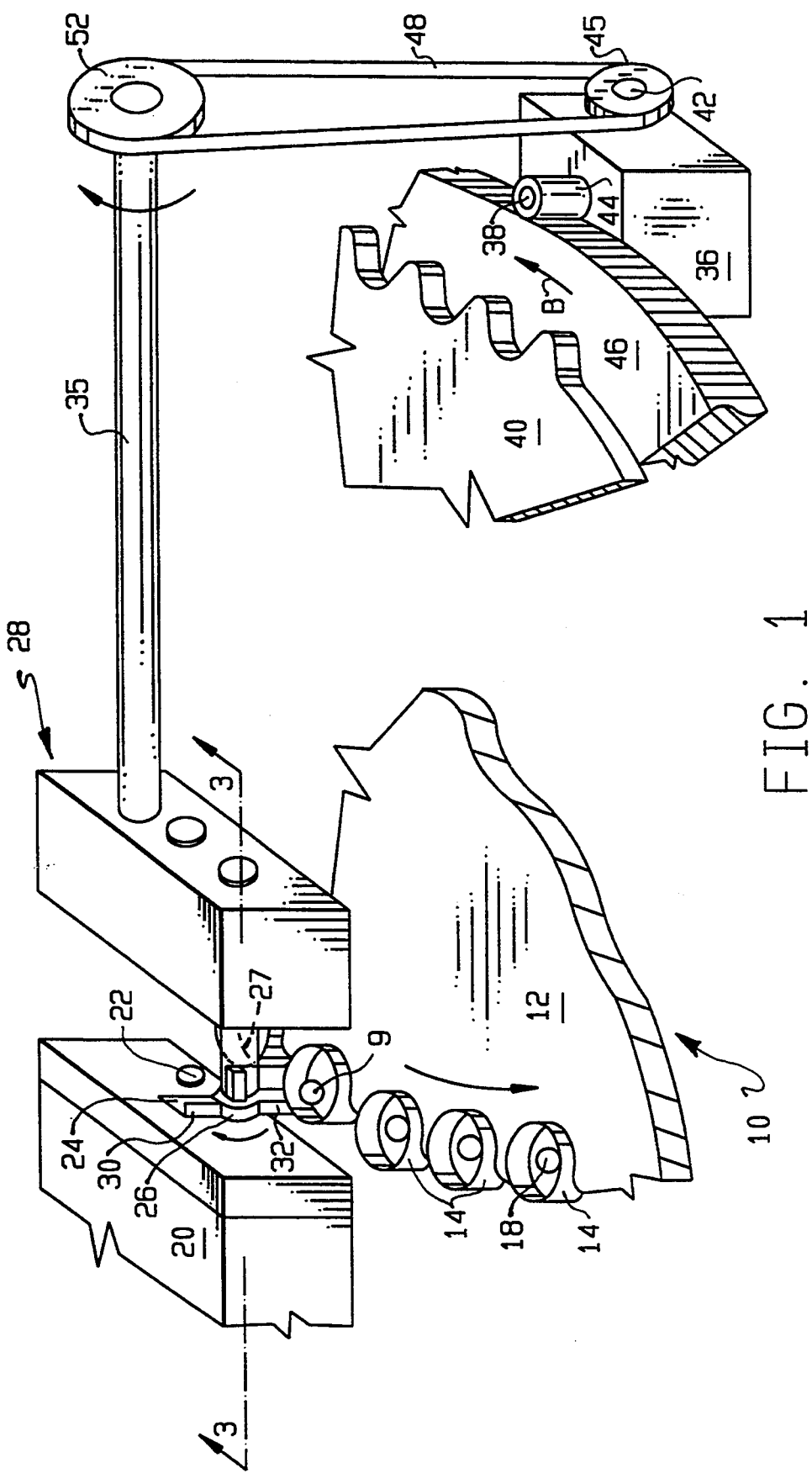
FIG. 1 is a partly broken away perspective view of the blade drive system of the present invention.

The apparatus 10 utilizing the principles of the present invention is illustrated in FIG. 1 and includes an endless conveyor 12, supported for rotation about a fixed vertical axis (not shown), which supports a plurality of open topped receptacles or crown shells 14 and moves them along a conveyance passage at a predetermined feed rate. Extruding means 20 is a conventional extruder provided adjacent the conveyance passage to melt extrudate material 22 and extrude the same through a discharge opening. Extrudate material 22 is extruded through the opening at a rate proportional to the feed rate so that the same measured amount of material is supplied for each receptacle.

Cutting means 24 is preferably a single rotating knife 26 which is coupled to the output shaft 27 of a rotary drive system 28 that will be described later. Although any conventional blade design may be utilized, knife 26 preferably comprises a pair of blades 30 and 32 and is positioned adjacent the discharge opening for cutting the extrudate material 22 into individual segments 18 and depositing them into the receptacles 14. When a dual blade knife is used as the cutting means, knife 26 is preferably operated at a rate proportional to the feed rate of receptacles 14 and the feed rate of extrudate material 22 such that each half rotation of the knife results in a measured amount of material being supplied to each receptacle.

Once the lining material has been dispensed onto the base of a receptacle, the receptacle 14 is supplied to a conventional molding station (not shown), whereat segments 18 may be molded into the desired shape of the crown lining.

The speed of conveyor 12, feed rate of extruder 20, and frequency of operation of knife 26 are all proportional at any rate of production for a particular material, to ensure that a metered charge is deposited into each receptacle. Unlike the devices disclosed in the prior art, however, knife 26 is intermittently driven at an angular velocity which is always greater than that delivered to the input shaft 35 of rotary drive system 28.

The synchronization of the operating speeds of conveyor 12 and rotating cutter 24 may accomplished by any conventional power transmission means. In the embodiment shown in FIG. 1, the apparatus 10 includes a speed reduction mechanism 36 such as a reduction gear box whose input shaft is connected to an output shaft of a conventional electric motor (not shown). The reduction mechanism 36 has a first output shaft 38 for rotating a turret 40 of conveyor 12 so as to convey receptacles at predetermined speeds and a second output shaft 42 for rotating the cutting knife 26. A gear 44 is fixed to the first output shaft 38 and comes into engagement with rotatably mounted gear 46. Turret 40 is connected to gear 46 and is adapted to rotate therewith. Accordingly, turret 40 is rotated at a uniform predetermined speed in the direction of arrow B via first output shaft 38, and gears 44 and 46.

A driving pulley 45 coupled to second output shaft 42 is also rotated at a uniform predetermined speed. An endless belt or chain 48 is trained over driving pulley 45 and over a driven pulley 52, which is secured to input shaft 35 of the rotary drive system 28.

Figure 2:
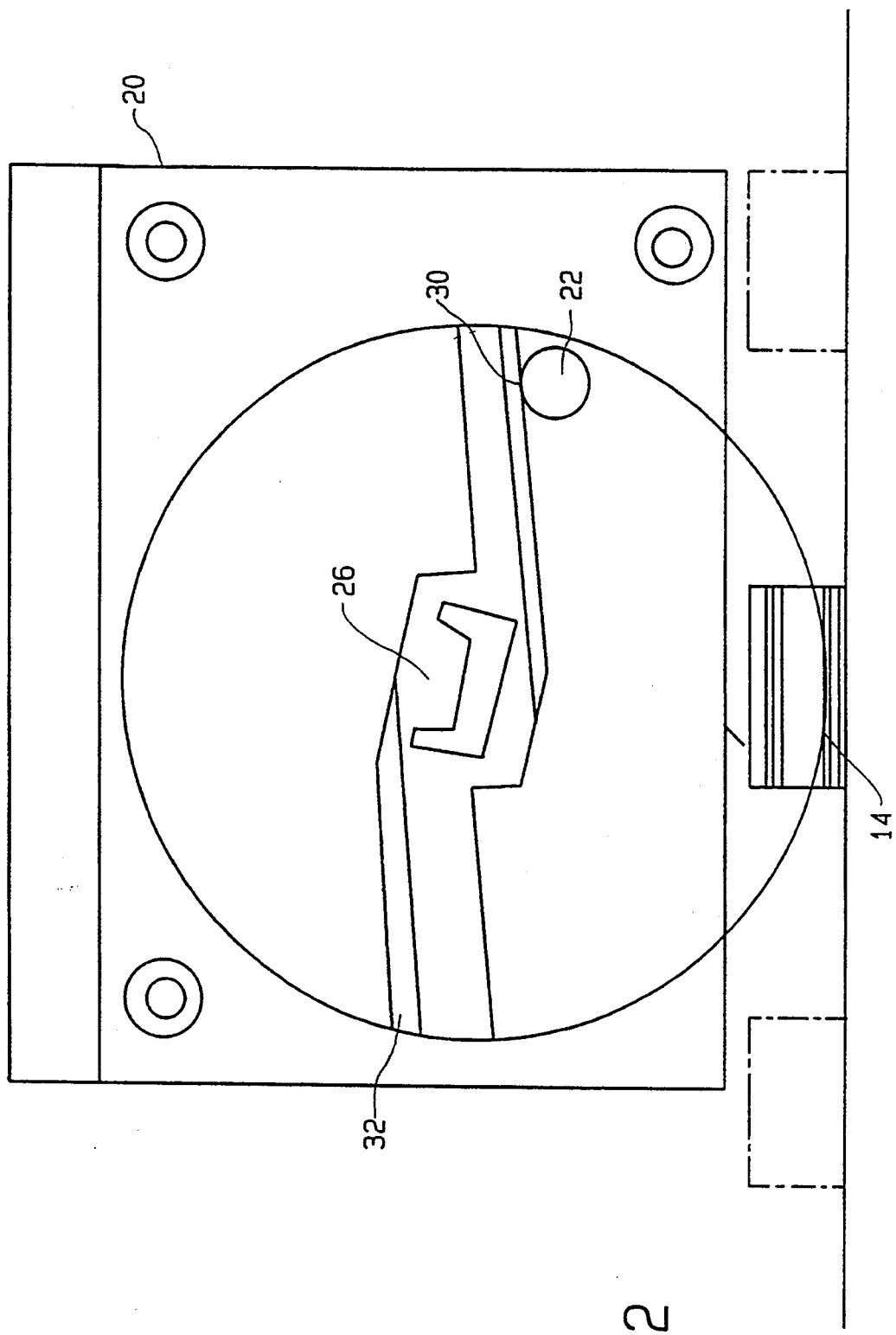
FIG. 2 is a partial plan view showing the blade drive system and liner material extruder of the apparatus shown in FIG. 1.

As shown in FIG. 2, rotation of the knife blade severs extrudate material 22 and results in the radial tip of a knife blade 30 or 32 passing into the recess of the receptacle 14. In order to permit the blade tip to enter the recesses of receptacles being fed at high production rates without contacting the sidewalls thereof, the present invention utilizes a novel rotary drive mechanism 28 which will now be described.

Figure 3:
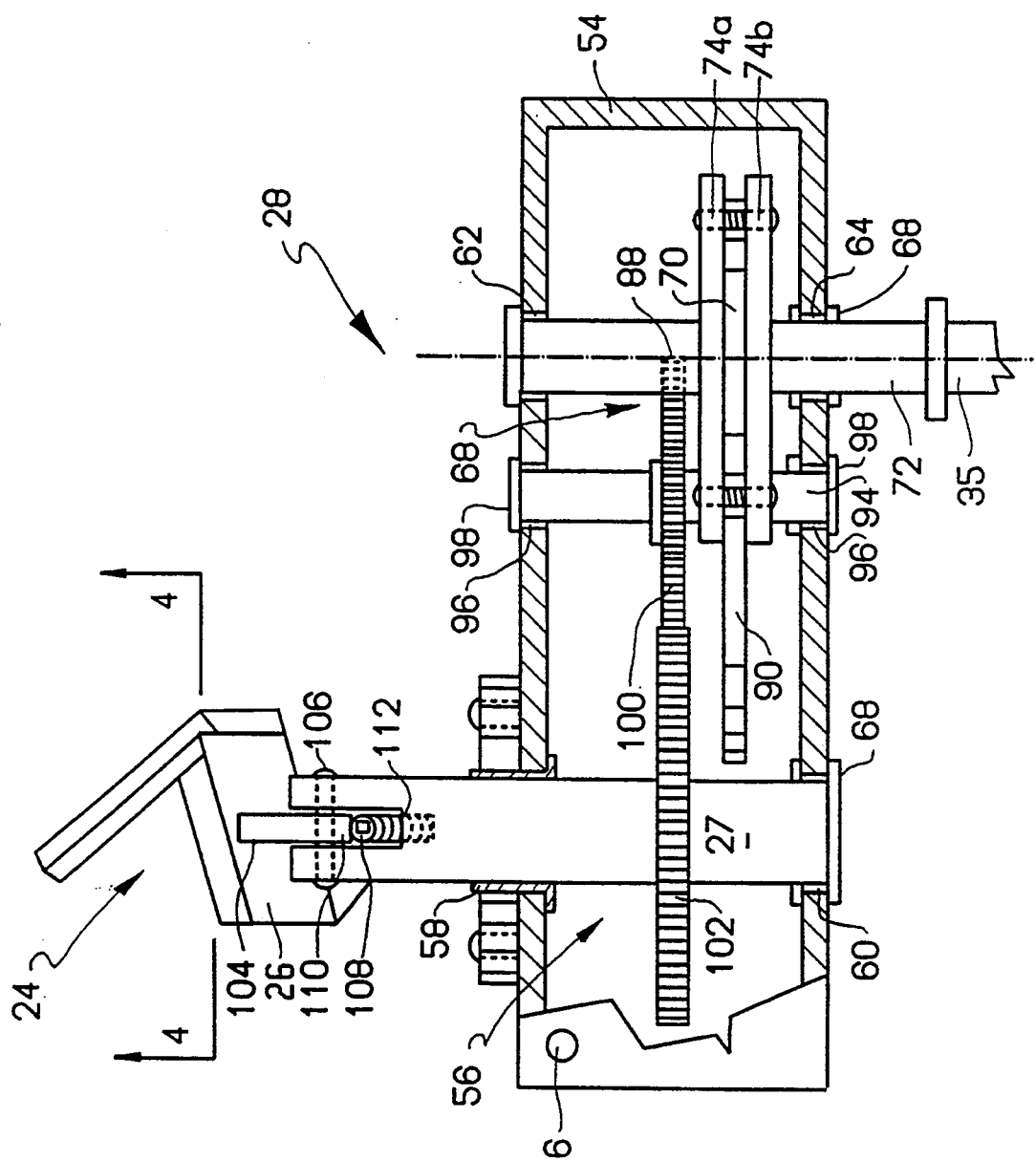
FIG. 3 is an enlarged cross sectional view taken along line 3—3 in FIG. 1.

Referring now to FIG. 3, continuous rotation of input shaft 35 is converted to intermittent rotation of output shaft 27 by a rotary drive mechanism 28. For this purpose, drive system 28 includes a housing 54 and an indexing drive assembly 56 interconnected between input shaft 35 and output shaft 27. Output shaft 27 is rotatably secured to the housing by a pair of conventional bearings 58 and 60. Input shaft 35 is coaxially coupled to the shaft 72, which is in turn rotatably secured to the housing by a pair of bearings 62 and 64. A port 66 is provided in the housing so that a suitable lubricant may be applied to the moving parts therein, and seals 68 may be secured to the housing over the respective bearings to prevent any leakage of the lubricant.

As indicated above, the drive mechanism 28 translates continuous rotation of the input shaft 35 into intermittent rotation of the output shaft 27. More particularly, indexing drive assembly 56 of the present invention is constructed such that for alternating 90° rotations of continuously driven input shaft 35, output shaft 27 and knife 26 coupled thereto rotates 180°. During the first 90° of input shaft rotation, output shaft 27 rotates 180 degrees, and blade 30 or 32 severs and deposits a segment of extrudate material into a receptacle. During the following 90° of driving shaft rotation, the positively driven output shaft remains stationary.

Indexing drive assembly 56 may include any appropriate gearing to obtain the desired intermittent rotation of output shaft 27. However, a geneva drive system is preferred because it permits positive, intermittent rotation of output shaft 27 such that the blade is not able to rotate during the stationary phase of intermittent operation. Accordingly, the indexing drive assembly 56 comprises a driving index unit 70 and a driven index member 90.

Driving index unit 70 may be mounted directly on input shaft 35. In the embodiment illustrated in FIG. 3, however, the index unit 70 includes shaft 72 which is coaxially coupled to input shaft 35, as noted above, for rotational movement therewith. The index unit 70 further comprises a pair of parallel, aligned plates 74a and 74b, and a pair of rollers 76 that extend between and interconnect the inwardly facing surfaces of the disks. Rollers 76 are rotatably secured to each plate and shaft 72 preferably extends through an axial hole in each plate to facilitate fixed mounting with respect thereto.

Figure 5:
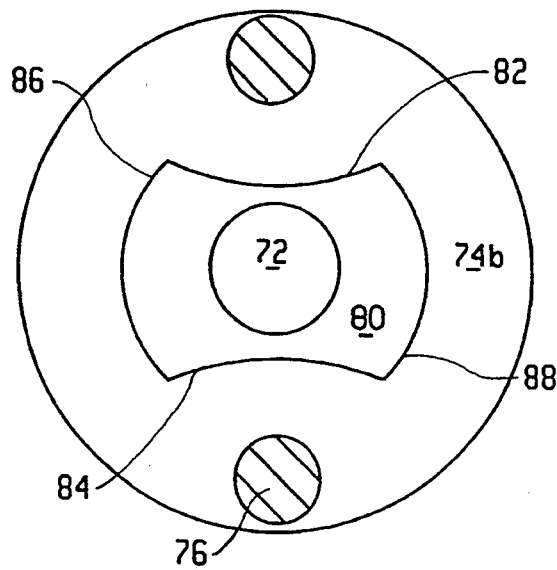
FIG. 5 is a cross sectional view of a portion of the blade drive system taken along line 5—5 in FIG. 4.
Figure 4:
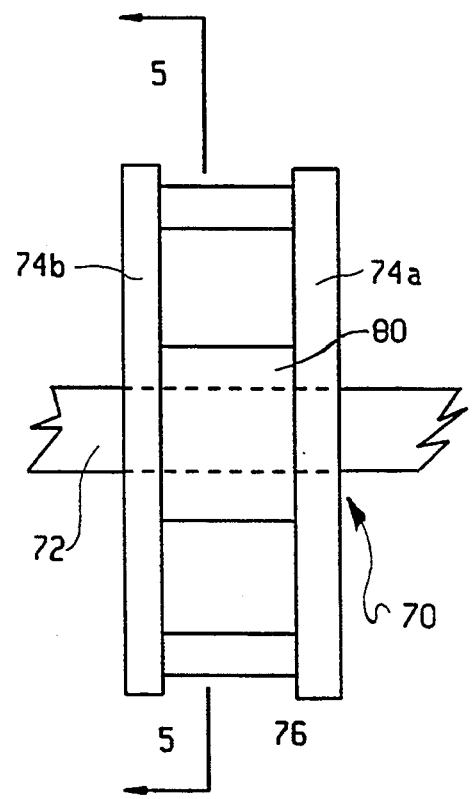
FIG. 4 is an enlarged side view of a portion of the blade drive system constructed in accordance with the present invention.

Plates 74a and 74b may be of any desired geometrical configuration, and if desired, one planar member having a pair of projecting members such as pins may be substituted therefor. As shown in FIG. 4, plates 74a and 74b are separated by a sufficient distance to allow cam member 80 to be mounted on shaft 72 therebetween for rotation therewith. As more clearly shown in FIG. 5, cam member 80 is scalloped on opposite sides of its periphery to define a pair of arcuate recesses 82, 84, thereby providing a pair of spaced lobes 86 and 88. The midpoint of each recess is aligned with the center of rollers 76 for reasons which will be discussed below.

Figure 6:
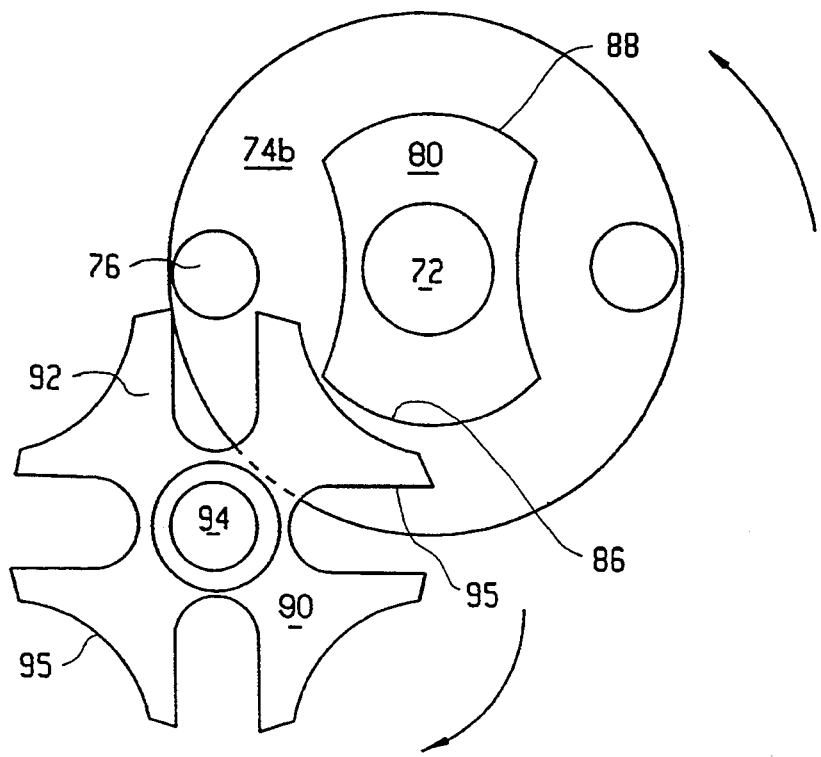
FIG. 6 is an enlarged cross sectional view taken along line 6—6 in FIG. 7.

With reference to FIGS. 3 and 6, the driven index member 90 of the preferred embodiment will now be described. As most clearly shown in FIG. 6, driven index member 90 is a planar member having two pairs of equiangularly spaced slots 92 and is secured by conventional coupling means (not shown) to a rotating index shaft 94. The peripheral surface of index member 90 is scalloped to produce four arcuate recesses 95 whose purpose will be explained later.

The slots 92 in index member 90 are disposed in a single plane which transects the axis of rotation defined by index shaft 94 and each slot is spaced by an angle of 90 degrees relative to its two adjacent slots. As seen in FIG. 3, index shaft 94 is rotatably secured to housing 54 by conventional bearings 96. Seals 98 may also be provided to prevent leakage of lubricant from within housing 54.

As best shown in FIG. 6, index member 90 is arranged adjacent to and coplanar with the driving index unit 70 such that one of the rollers 76 is received in a slot 92 each time the input shaft 35 and shaft 72 coupled thereto are rotated 180°. It will thus be apparent that 180° rotation of input shaft 35 will result in 90° rotation of index shaft 94 as alternating rollers 76 engage successive slots 92. In order to prevent rotation of index shaft 94 during periods in which no roller is present in a slot (i.e. to achieve a positive drive) arcuate recesses 95 of index member 90 are dimensioned to slidingly receive lobes 86 and 88 of cam member 80 during rotation of index shaft 94. During the period when index shaft 94 is stationary, however, the peripheral surface of cam 80 engages the surface of a recess 95 to prevent rotation of the index shaft.

Figure 7:
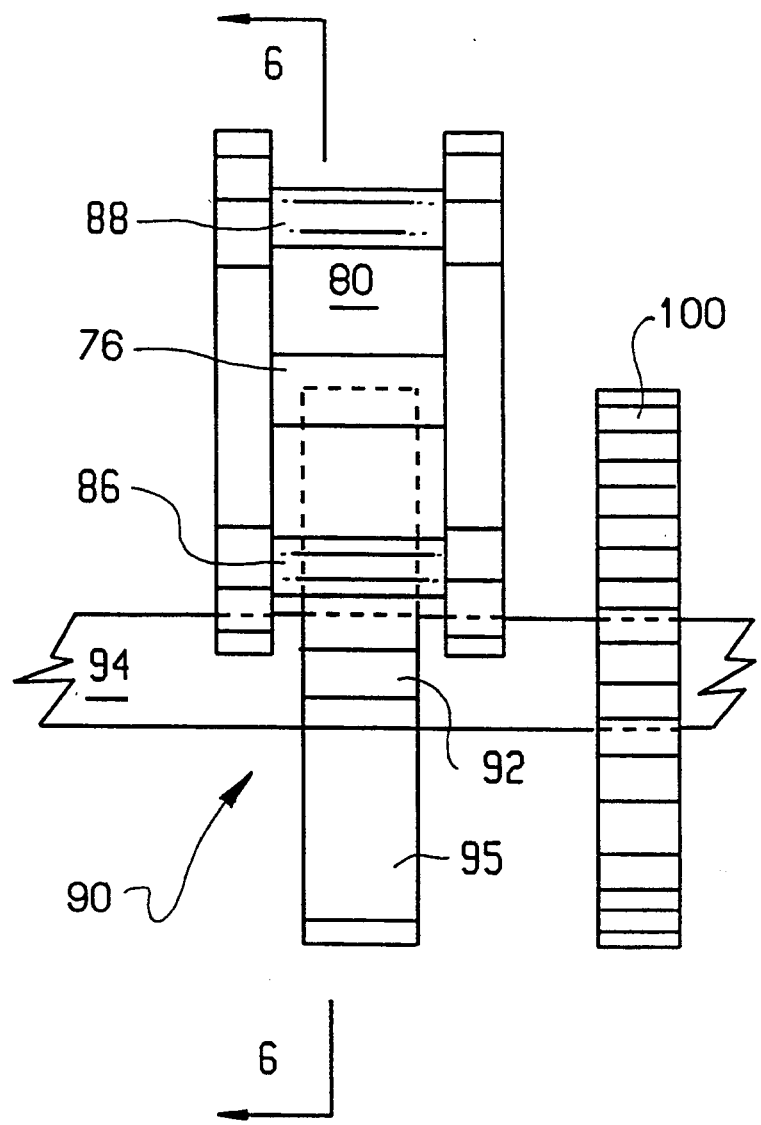
FIG. 7 is an enlarged side view showing the interrelation of the index plate and index drive of the present invention.

As shown in FIG. 7, a conventional spur gear 100 is secured to index shaft 94 for intermittent rotation therewith. In FIG. 3, it can be seen that a driving gear 102 coupled to output shaft 27 is drivingly engaged by gear 100, thereby effecting intermittent rotation of knife 26. By selecting appropriate numbers of teeth and diameters for gears 100 and 102, a first 90° rotation of the index shaft 72 will result in 180° degree rotation of the output shaft 27 at twice the angular velocity at which input shaft 35 is rotated.

While knife 26 is stationary, blades 30 and 32 preferably remain in a substantially vertical orientation. Thus, during the 180° rotation of knife 26, blade 30 moves into the position previously occupied by blade 32, thereby severing a segment 18 of extrudate and depositing it centrally into a receptacle 14. During the next period of knife dwell (i.e. the next 90° rotation of input shaft 35), the trailing sidewall portion of the receptacle approaches the trailing edge of blade 30. Before any interference takes place therebetween, however, rotation of the knife resumes and blade 30 exits the receptacle. It will be apparent to those of ordinary skill in the art that the intermittent rotation of the blade at a higher rotational speed permits the knife to enter and exit even deeply recessed receptacles without contacting the sidewall portions. The knife of the present invention can also be rotated fast enough to avoid the reductions in cutting efficiency and the inaccuracy in pellet placement associated with prior art systems.

The knife 26 may be secured to output shaft 27 by any conventional coupling means. By way of example, the knife may include an axial bore for coupling to an annular hub mounted on the output shaft 27. Alternatively, the knife may be provided with an integral, centrally located annular flange through which a screw or other fastener may be inserted into the shaft 27. In the embodiment shown in FIG. 3, however, knife 26 is provided with an axial stem 104 which is received in a slotted end of shaft 27. A transverse pin 106 pivotally secures axial stem 104 to shaft 27, and pivoting of the stem about the pin is resiliently limited by a biassing spring 108. Spring 108 is secured between the distal end 110 of stem 104 and base 112 of the slot in shaft 27 such that one end of the spring 108 extends centrally into base 112 along the axis of rotation of shaft 27. Thereafter, spring 108 is bent so that its other end extends outwardly and away from the center of shaft 27. The curved portion of the spring biases the knife about an axis defined by pin 106, thereby permitting the rotary knife 26, to "float" angularly relative to shaft 27. Thus, the biassed knife coupling arrangement of the present invention compensates for any buildup of lining material on the blade and ensures precise cutting of the extruded lining material.

The drive mechanism of the present invention may also be provided as a kit for retrofitting an existing processing machine, with the various components within housing 54 being coupled to input and output shafts of the existing machine by the user.

As will be apparent to those of ordinary skill in the art, various modifications and adaptations of the structure above described will become readily apparent without departure from the spirit and scope of the invention, the scope of which is defined in the appended claims.

What is claimed is:

1. An apparatus for dispensing segments of extrudate material into receptacles, comprising:
   conveying means defining a passage for conveying receptacles each having a sidewall;
   means for extruding said extrudate material through a discharge opening into said passage;
   a knife positioned adjacent said discharge opening for cutting said extrudate material into segments; and
   means for rotating said knife at a rotational velocity which is greater than the velocity of movement of the receptacles on the conveying means and means for intermittently rotating said knife so that the knife cuts the extrudate without interfering with the sidewalls of the receptacles, when operated at feed rates of above 2000 receptacles per minute.

2. The apparatus of claim 1 wherein said knife intermittent rotating means includes an input shaft, means for substantially uniformly rotating said input shaft at a uniform angular velocity, an output shaft coupled to said knife for intermittent rotation therewith, and transmission means interconnecting said input and output shafts for converting the substantially uniform rotation of said input shaft into intermittent rotation of said output shaft.

3. The apparatus of claim 2, wherein said conveying means comprises a rotating turret for conveying said receptacles at a speed proportional to said uniform angular velocity.

4. The apparatus of claim 2, wherein said knife rotating means further includes means for coupling said knife to said output shaft.

5. The apparatus of claim 4, wherein said coupling means comprises a pivot pin, and said coupling means further comprises means for biasing said knife about an axis defined by said pivot pin.

6. The apparatus of claim 5 wherein said biasing means comprises a spring positioned between said knife and said output shaft.

7. The apparatus of claim 2, wherein said transmission means includes first gear means, said first gear means including a plurality of projecting members and means for mounting said projecting members relative to said input shaft.

8. The apparatus of claim 7 wherein said mounting means defines an axis of rotation coaxial with said input shaft and comprises a first member coupled to said drive shaft and wherein said projecting members extend from a plane transverse to said axis of rotation.

9. The apparatus of claim 8 wherein said mounting means further comprises a second member coaxially aligned with said first member, said first and second members being interconnected by said projecting members.

10. The apparatus of claim 9 wherein the projecting members are rollers, each of said rollers being adapted to rotate about an axis parallel to said axis of rotation.

11. The apparatus of claim 8 wherein said first gear means further comprises means for intermittently preventing rotation of said output shaft.

12. The apparatus of claim 11, wherein said preventing means comprises a cam member coupled to said first member for rotation therewith.

13. The apparatus of claim 12, wherein said cam member has a peripheral surface which defines a pair of arcuate lobes.

14. The apparatus of claim 13, wherein said transmission means further comprises second gear means including an intermediate shaft defining a second axis of rotation and a plate member defining a plurality of slots dimensioned and arranged for engagement with said projecting members, wherein said plate member is secured to said intermediate shaft for rotation therewith in response to engagement with said projecting members.

15. The apparatus of claim 14 wherein said plurality of slots comprise four slots, adjacent slots being angularly spaced 90° from each other, wherein engagement by one of said projecting members with one of said slots converts a 180° rotation of said input shaft into 90° rotation of said plate member.

16. The apparatus of claim 15 wherein a peripheral surface of said plate member defines four arcuately recessed surfaces and wherein said recessed surfaces are adapted to engage the lobes of said cam member, said lobes being arranged for movement relative to said projecting members such that said plate member is prevented from rotating unless a projecting member is in one of said slots.

17. A timing apparatus for intermittently rotating a knife, comprising:
    conveying means operating at a conveying rate;
    an input shaft;
    means for substantially uniformly rotating said input shaft at a uniform angular velocity;
    an output shaft; and
    a knife coupled to the output shaft for intermittent rotation therewith;
    transmission means interconnecting said input and output shafts for converting the substantially uniform rotation of said input shaft into intermittent rotation of said output shaft at a velocity which is greater than that of the conveying means.

18. The apparatus of claim 17, wherein said transmission means includes first gear means, said first gear means including a plurality of projecting members and means for mounting said projecting members relative to said input shaft.

19. The apparatus of claim 18 wherein said mounting means defines an axis of rotation coaxial with said input shaft and comprises a first member coupled to said drive shaft and wherein said projecting members extend from a plane transverse to said axis of rotation.

20. The apparatus of claim 19 wherein said mounting means further comprises a second member coaxially aligned with said first member, said first and second members being interconnected by said projecting members.

21. The apparatus of claim 19 wherein the projecting members are rollers, each of said rollers being adapted to rotate about an axis parallel to said axis of rotation.

22. The apparatus of claim 18 wherein said first gear means further comprises means for intermittently preventing rotation of said output shaft.

23. The apparatus of claim 22, wherein said preventing means comprises a cam member coupled to said first member for rotation therewith.

24. The apparatus of claim 23, wherein said cam member has a peripheral surface which defines a pair of arcuate lobes.

25. The apparatus of claim 24, wherein said transmission means further comprises second gear means including an intermediate shaft defining a second axis of rotation and a plate member defining a plurality of slots dimensioned and arranged for engagement with said projecting members, wherein said plate member is secured to said intermediate shaft for rotation therewith in response to engagement with said projecting members.

26. The apparatus of claim 25 wherein said plurality of slots comprise four slots, adjacent slots being angularly spaced 90° from each other, wherein engagement by one of said projecting members with one of said slots converts a 180° rotation of said input shaft into 90° rotation of said plate member.

27. The apparatus of claim 26 wherein a peripheral surface of said plate member defines four arcuately recessed surfaces and wherein said recessed surfaces are adapted to engage the lobes of said cam member, said lobes being arranged for movement relative to said projecting members such that said plate member is preventing from rotating unless a projecting member is in one of said slots.

* * * * *